(12) United States Patent
Adam et al.

(10) Patent No.: US 9,303,096 B2
(45) Date of Patent: *Apr. 5, 2016

(54) EXPANDABLE ELASTOMERIC MATERIAL IN THE PRESENCE OF WATER OR OIL

(75) Inventors: Herve Adam, Clarksburg, NJ (US); Arnaud Cadix, Saint-Ouen (FR); Chi-Thanh Vuong, Lognes (FR)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/799,153

(22) Filed: Apr. 20, 2010

(65) Prior Publication Data

US 2011/0257333 A1    Oct. 20, 2011

(51) Int. Cl.
| C08G 73/00 | (2006.01) |
| C08G 18/00 | (2006.01) |
| C08F 2/32 | (2006.01) |
| C08G 18/69 | (2006.01) |
| C08F 220/56 | (2006.01) |
| C08L 23/06 | (2006.01) |
| C08L 83/04 | (2006.01) |

(52) U.S. Cl.
CPC .............. C08F 2/32 (2013.01); C08F 220/56 (2013.01); C08G 18/69 (2013.01); C08L 23/06 (2013.01); C08L 83/04 (2013.01)

(58) Field of Classification Search
CPC ...... A01N 33/12; A01N 2300/00; C08F 2/32; C04B 24/2652; C04B 2103/0045
USPC .......................................... 524/801, 839, 845
See application file for complete search history.

(56) References Cited

U.S. PATENT DOCUMENTS

| 5,080,809 | A | * | 1/1992 | Stahl et al. | 507/221 |
| 5,145,825 | A | | 9/1992 | Deeba et al. | |
| 5,739,378 | A | * | 4/1998 | Jenkins et al. | 560/181 |
| 6,288,007 | B1 | | 9/2001 | Lindblad et al. | |
| 6,346,588 | B1 | * | 2/2002 | Fenchl et al. | 526/218.1 |
| 7,373,991 | B2 | * | 5/2008 | Vaidya et al. | 166/381 |
| 7,638,459 | B2 | | 12/2009 | Rende et al. | |
| 7,956,012 | B2 | * | 6/2011 | Gupta et al. | 507/120 |
| 8,183,181 | B1 | * | 5/2012 | Gupta et al. | 507/120 |
| 2002/0017493 | A1 | * | 2/2002 | Ehrnsperger et al. | 210/660 |
| 2003/0060793 | A1 | | 3/2003 | Topolkaraev et al. | |
| 2003/0147825 | A1 | * | 8/2003 | Chiarelli et al. | 424/70.11 |
| 2003/0165882 | A1 | | 9/2003 | Huang et al. | |
| 2004/0024154 | A1 | | 2/2004 | Schinabeck et al. | |
| 2007/0027245 | A1 | * | 2/2007 | Vaidya et al. | 524/424 |
| 2008/0125335 | A1 | | 5/2008 | Bhavsar | |
| 2008/0194717 | A1 | * | 8/2008 | Vaidya et al. | 521/142 |
| 2009/0036571 | A1 | | 2/2009 | Friedrich et al. | |
| 2009/0260820 | A1 | * | 10/2009 | Kurian et al. | 166/292 |
| 2009/0264325 | A1 | | 10/2009 | Atkins et al. | |
| 2010/0093874 | A1 | * | 4/2010 | Monin et al. | 514/772.4 |
| 2010/0210724 | A1 | * | 8/2010 | Cadix et al. | 514/556 |
| 2010/0267552 | A1 | | 10/2010 | Koranne et al. | |
| 2011/0257333 | A1 | * | 10/2011 | Adam et al. | 524/839 |

FOREIGN PATENT DOCUMENTS

| EP | 2404975 | * | 4/2010 |
| EP | 2381065 | * | 10/2011 |
| FR | 2914647 | * | 10/2008 |
| JP | 2003041065 | | 2/2003 |
| WO | 2011131307 A1 | | 10/2011 |
| WO | WO 2011/131306 | * | 10/2011 |

* cited by examiner

Primary Examiner — Michael A Salvitti

(57) ABSTRACT

A process for the preparation of an elastomer capable of swelling in oil and/or in water and brine comprising the steps of: a) making an aqueous inverse emulsion of particles of a polymer comprising a betaine group prepared by inverse emulsion polymerization of monomers $A_b$ comprising a betaine group, optionally other monomers $B_a$ and a small quantity of polyvalent, preferably divalent or trivalent monomers $C_a$, comprised in an aqueous phase dispersed in the form of droplets in a hydrophobic external phase having hydrophobic surfactants, the molar ratio of the monomers $A_b$ to the optional monomers $B_a$ being between 4/96 and 40/60, preferably 7/93 and 30/70, the molar ratio of the polyvalent, preferably divalent or trivalent monomers $C_a$ per mole of polymer being between 1.5 and 10, preferably between 2 and 4, and b) compounding said elastomer with the aqueous inverse emulsion obtained by step a).

20 Claims, No Drawings

EXPANDABLE ELASTOMERIC MATERIAL IN THE PRESENCE OF WATER OR OIL

FIELD OF THE INVENTION

The present invention relates to an expandable elastomeric material in the presence of water or oil and their use in specific applications.

BACKGROUND OF THE INVENTION

Commonly used elastomers are designed to resist swelling in oil and in water and brine.

Oil-swellable packers used in sealing systems are available on the market, as well as expandable profilers and coatings that use a water-swellable elastomer.

Most commercially available elastomers exhibit a high resistance to swelling in water and brines, but are not too resistant to swelling in oils. Resistance to water and brine swelling is required for common non-oilfield applications like tires, hose, wire and cable applications, and the like. Many commonly used elastomers exhibit poor resistance to swelling in oil. Other elastomers such as nitrile, hydrogenated nitrile, fluoroelastomers and acrylate-based elastomers are designed to resist swelling in oil and are resistant to swelling in water and brine.

Commonly used elastomers such as EPDM rubber, nitrile rubber, silicone rubber and the like are per se resistant to swelling in water and brine. However there is a need to develop expandable or swellable elastomers in oils or in water and brine and one of the goals of the instant invention is to propose means for rendering those elastomers able to swell in oils or in water and brine for most of the different kinds of elastomeric rubbers.

Another goal of the invention is to propose swellable/expandable elastomers as defined above with good mechanical properties and a good durability lasting for months even years.

Another goal of the invention is to propose swellable/expandable coatings and powders based on elastomers for example for composite cement applications as defined above with good mechanical properties and a good durability lasting for months even years.

SUMMARY OF THE INVENTION

Those goals and others are met by the instant invention which relates to the preparation of an elastomer capable of swelling in oil and/or in water and brine comprising the steps of:

a) making an aqueous inverse emulsion of particles of a polymer comprising a betaine group prepared by inverse emulsion polymerization of monomers $A_b$ comprising a betaine group, optionally other monomers $B_a$ and a small quantity of polyvalent, preferably divalent or trivalent monomers $C_a$, comprised in an aqueous phase dispersed in the form of droplets in a hydrophobic external phase having hydrophobic surfactants, the molar ratio of the monomers $A_b$ to the optional monomers $B_a$ being between 4/96 and 40/60, preferably 7/93 and 30/70, the molar ratio of the polyvalent, preferably divalent or trivalent monomers $C_a$ per mole of polymer which would have been obtained without the addition of monomers $C_a$, being between 1.5 and 10, preferably between 2 and 4, and b) compounding said elastomer with the aqueous inverse emulsion obtained by step a).

DETAILED DESCRIPTION OF THE INVENTION

In this application, the term "hydrophobic" is used in its usual sense of "who has no affinity for water", meaning that the organic polymer which it is formed, taken alone (with the same composition and the same molecular weight), will present a macroscopic two-phase solution in distilled water at 25° C. and at a concentration of more than 1% by weight.

In this application, the terms "hydrophilic", "water soluble" and "hydrodispersable" are also used in their usual sense of "who has affinity for water", i.e. not capable of forming a macroscopic two-phase solution in distilled water at 25° C. at a concentration greater than 1% by weight. The term "polymer which would have been obtained without the addition of monomers $C_a$" means the polymer obtained by carrying out the same process with the same monomers except that the monomer $C_a$ is not used.

In this application, the terms "elastomer rubber" and "elastomeric composition" includes any rubber or composition having desired elastomeric and swelling properties for the intended purpose of making an expandable elastomeric material in the presence of water and brine or oil. For example, in some embodiments an elastomeric composition may comprise substantially all elastomers, while in other formulations the elastomer may be accompanied by one or more other polymeric or non-polymeric compositions, such as thermoplastic and thermoset polymers, plasticizers, fillers, shape stabilizers, and the like. In this application, the term "brine" means any aqueous medium containing dissolved salts like industrial solutions, sea water, sewage fluids. Most common salts are alkaline or earth-alkaline chlorides, sulphates and carbonates.

The elastomeric composition may further comprise additives, fillers, and the like, depending on the end use of the swellable/expandable elastomer. In this application, unless otherwise indicated, the term "molecular weight", means the average molecular weight in absolute mass, expressed in grams per mole ("g/mol"). That molecular weight can be determined by aqueous gel permeation chromatography (GPC), diffusion of light (DDL or MALLS for an aqueous eluent), with an aqueous or organic eluent (i.e., formamide) depending upon the composition of polymer.

The reduced specific viscosity is measured by dissolving the polymer in a 20% by weight aqueous NaCl solution. The intrinsic viscosity η is then obtained by linear extrapolation of the reduced specific viscosity to zero concentration of polymer. The slope of this extrapolation is equal to $k'(\eta)^2$, k' being the Huggins coefficient. This method of calculating η is described in detail in the publication Polymer Handbook ($4^{th}$ edition), J. Brandrup, E. H. Immergut and E. A. Grulke, Wiley (1999), cited as reference. This specific viscosity makes it possible to have indirect access to the molecular weights of greater than approximately 2 000 000, which cannot be directly determined experimentally.

According to a variant of the process of the invention, in step a), a reactive monomer to chemical functions present in the elastomer is added to the aqueous emulsion before its addition to said elastomer.

Preferably, the particles of polymer have a particle size of from 10 nanometers ("nm") to 10 000 nm, and, more preferably from 100 nm to 1000 nm.

It is recommended to use 1 to 49% by weight of the aqueous inverse emulsion for 99 to 51% by weight of elastomer, said inverse emulsion preferably comprising between 10 and 40% by weight of water. The monomer $C_a$ is used molar ratio of the polyvalent, preferably divalent or trivalent monomers $C_a$ per mole of polymer which would have been obtained without the addition of monomers $C_a$, being between 1.5 and 10, preferably between 2 and 4, which represents most of the time fact a small quantity of monomer $C_a$. Examples of a small quantity of polyvalent, preferably divalent or trivalent monomers $C_a$ defined otherwise is a quantity comprised between 0.001 and 0.1 mole percent ("mol %"), preferably between 0.002 and 0.2 mol %.

According to a second aspect of the invention, the aqueous inverse emulsion a) can be further partially dehydrated and de-oiled in the form of a dry solid, preferably a dried powder, containing the hydrophilic polymer and its hydrophobic surfactants. That partial or total dehydration and de-oiling can be spray drying or drying by blowing hot air on the emulsion coated on a flat surface like a plate, wherein water and then oil is partially or totally eliminated. The surfactants used for the stabilization of the polymer in the inverse emulsion polymerization process are most useful to the polymer redispersion in hydrophobic media. In that case, the redispersion of the polymer in any oil is easy to carry out without extensive mixing. It is also possible to obtain the dehydrated polymer without the surfactants by mixing the inverse emulsion with a compound which is a no-solvent of the polymer, preferably by pouring the inverse emulsion in that compound being a no-solvent of the polymer and dissolving at least partially the other components of the inverse emulsion. An example of such a compound is acetone. The use of that dried aqueous inverse emulsion is recommended for the preparation of swellable/expandable coatings and powders based on elastomers for example for composite cement applications. In that case the elastomers are more particularly:

a mono-component room temperature vulcanisable silicone (RTV-1 type) curing with the ambient humidity of atmospheric air and comprising a hydrolysable silane and an alpha, omega-dihydroxy silicone oil, where the silicone RTV-1 compounded with the dried copolymer inverse emulsion present good swelling in aromatic oils presents a good swelling in water and brine;

a polyurethane rubber based on the curing of an isocyanate functionalized polybutadiene system with a polybutadiene chain extender, where the polyurethane compounded with the dried copolymer inverse emulsion present good swelling in aromatic oils; and/or an EPDM rubber or a nitrile rubber.

The aqueous inverse emulsion of the polymer is thus prepared by an inverse polymerization process comprising the following steps:
a1) preparation of the inverse emulsion, and
a2) polymerization.

Step a1) is carried out by emulsification of a mixture comprising the aqueous phase comprising the monomers, the external phase and at least one emulsifying agent. The polymerization is carried out by bringing together the monomers $A_b$ and, optionally other monomers $B_a$ and the small quantity of polyvalent monomers $C_a$, with a compound which generates free radicals and the polymerization is carried out at a temperature between, for example, ambient temperature and 75° C., depending upon the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate.

The preferred emulsifying agents are sorbitan monooleate. These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

As mentioned above, the polymerization is initiated by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Examples of oil-soluble initiators are azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3/NaHSO_3$ or $KBrO_3/NaS_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

The polymer is provided in any practical form, for example, directly in the form of the inverse emulsion as obtained by the polymerization process, or in the form of in the dry solid form or in the vectorized form, for example in the form of a solution or of an emulsion or of a suspension, in particular in the form of an aqueous solution. The vectorized form, for example an aqueous solution, can in particular comprise from 15 to 50% by weight, for example from 20 to 30% by weight, of the polymer.

According to the invention, the betaine group is a group composed of the following monomers:
(a) alkylsulphonates or -phosphonates of dialkylammonioalkyl acrylates or methacrylates, -acrylamides or -methacrylamides, such as:
  (a.i) sulphopropyldimethylammonioethyl methacrylate, sold by Raschig under the name SPE:

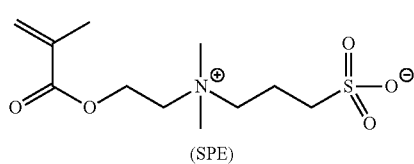 [SMILES: C=C(C)C(=O)OCC[N+](C)(C)CCCS(=O)(=O)[O-]]

(SPE)

(a.ii) sulphoethyldimethylammonioethyl methacrylate and sulphobutyldimethylammonioethyl methacrylate:

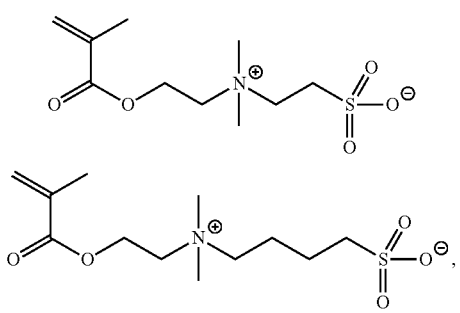

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002), (a.iii) sulphohydroxypropyldimethylammonioethyl methacrylate:

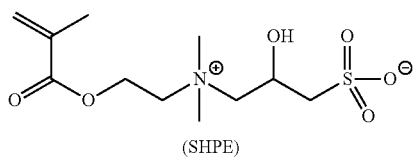 [SMILES: C=C(C)C(=O)OCC[N+](C)(C)CC(O)CS(=O)(=O)[O-]]

(SHPE)

(a.iv) sulphopropyldimethylammoniopropylacrylamide:

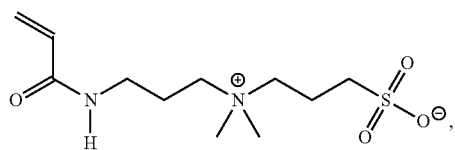 [SMILES: C=CC(=O)NCCC[N+](C)(C)CCCS(=O)(=O)[O-]]

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994), (a.v) sulphopropyldimethylammoniopropylmethacrylamide, sold by Raschig under the name SPP:

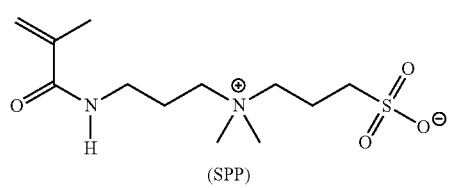

(SPP)

(a.vi) sulphopropyldimethylammonioethyl methacrylate, sold by Raschig under the name SPDA:

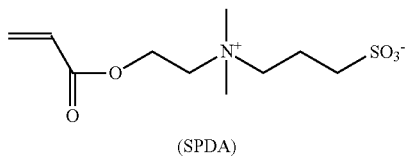

(SPDA)

(a.vii) sulphohydroxypropyldimethylammoniopropylmethacrylamide:

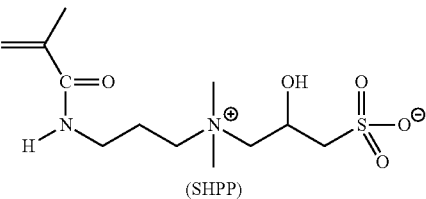

(SHPP)

(a.viii) sulphopropyldiethylammonioethyl methacrylate:

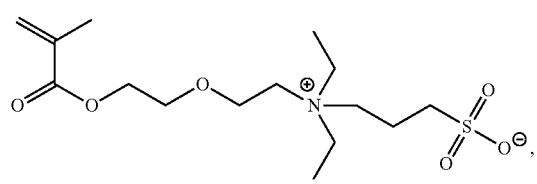 [SMILES: C=C(C)C(=O)OCCOCC[N+](CC)(CC)CCCS(=O)(=O)[O-]]

the synthesis of which is described in the paper "Poly (sulphopropylbetaines): 1. Synthesis and characterization", V. M. Monroy Soto and J. C. Galin, Polymer, 1984, Vol. 25, 121-128, (a.ix) sulphohydroxypropyldiethylammonioethyl methacrylate:

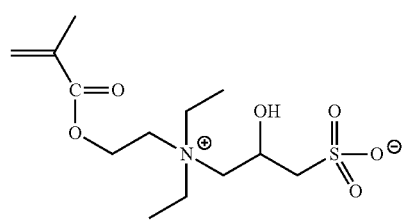 [SMILES: C=C(C)C(=O)OCC[N+](CC)(CC)CC(O)CS(=O)(=O)[O-]]

(b) heterocyclic betaine monomers, such as:

(b.i) sulphobetaines derived from piperazine:

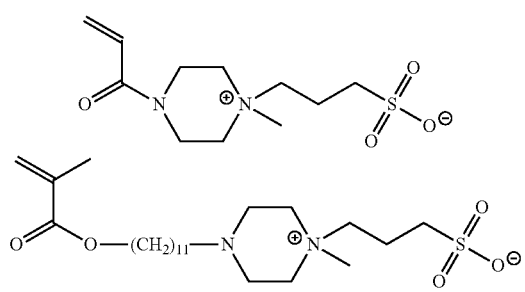

-continued

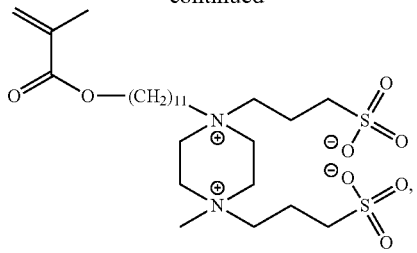

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), (b.ii) sulphobetaines derived from 2-vinylpyridine and 4-vinylpyridine, such as (b.ii.1) 2-vinyl-1-(3-sulphopropyl)pyridinium betaine (2SPV or "SPV"), sold by Raschig under the name SPV:

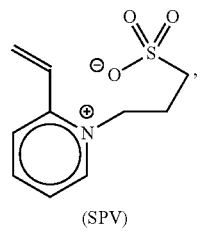

(SPV)

(b.ii.2) 4-vinyl-1-(3-sulphopropyl)pyridinium betaine (4SPV), the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990):

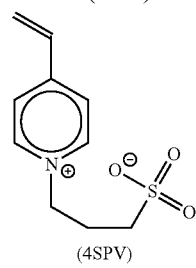

(4SPV)

(b.ii.3) 1-vinyl-3-(3-sulphopropyl)imidazolium betaine:

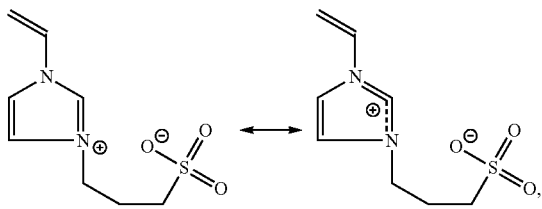

the synthesis of which is described in the paper "Aqueous solution properties of a poly(vinyl imidazolium sulphobetaine)", J. C. Salamone, W. Volkson, A. P. Olson, S. C. Israel, Polymer, 19, 1157-1162 (1978), (c) alkylsulphonates or -phosphonates of dialkylammonioalkylallylics, such as sulphopropylmethyldiallylammonium betaine:

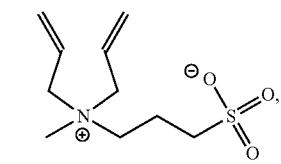

the synthesis of which is described in the paper "New poly(carbobetaine)s made from zwitterionic diallylammonium monomers", Favresse, Philippe; Laschewsky, Andre, Macromolecular Chemistry and Physics, 200(4), 887-895 (1999), (d) alkylsulphonates or -phosphonates of dialkylammonioalkylstyrenes, such as:

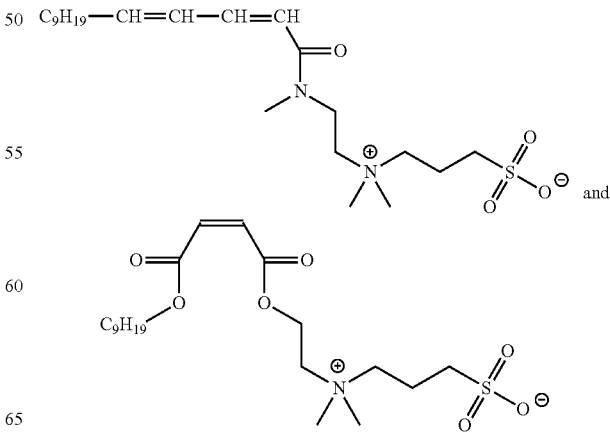

the synthesis of which is described in the paper "Hydrophobically Modified Zwitterionic Polymers Synthesis, Bulk Properties, and Miscibility with Inorganic Salts", P. Koberle and A. Laschewsky, Macromolecules, 27, 2165-2173 (1994), (e) betaines resulting from ethylenically unsaturated anhydrides and dienes, such as:

the synthesis of which is described in the paper "Hydrophobically Modified Zwitterionic Polymers Synthesis, Bulk Properties, and Miscibility with Inorganic Salts", P. Koberle and A. Laschewsky, Macromolecules, 27, 2165-2173 (1994), (f) phosphobetaines, such as:

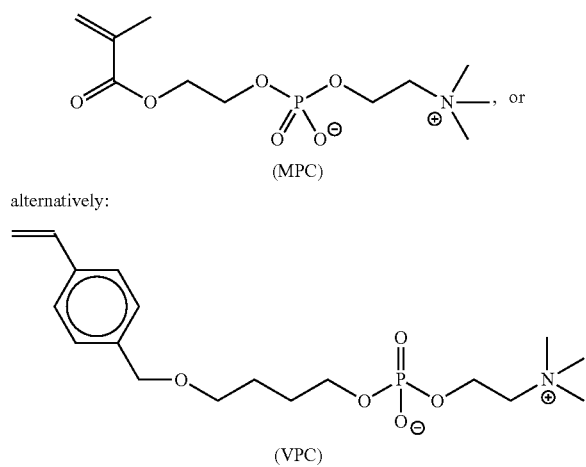

(MPC)

alternatively:

(VPC)

the synthesis of which is described in EP 810 239 B1 (Biocompatibles, Alister et al.).

In one embodiment, the betaine is according to the formula:

or the formula:

in which:
R$^1$ is hydrogen or methyl,
R$^2$ and R$^3$, which are identical or different, are hydrogen or alkyls having from 1 to 6 carbon atoms,
Y$_1$ is a divalent group of formula —O— or NR$_2$,
Z$^-$ is SO$_3^-$,
m is 2 or 3, and
n is 1-6.

In one embodiment, monomer A$_b$ comprises:
sulphopropyldimethylammonioethyl methacrylate (SPE),
sulphoethyldimethylammonioethyl methacrylate,
sulphobutyldimethylammonioethyl methacrylate,
sulphohydroxypropyldimethylammonioethyl methacrylate (SHPE),
sulphopropyldimethylammoniopropylacrylamide,
sulphopropyldimethylammoniopropylmethacrylamide (SPP),
sulphohydroxypropyldimethylammoniopropylmethacrylamide (SHPP), sulphopropyldimethylammonioethyl acrylate (SPDA),
sulphopropyldiethylammonioethyl methacrylate,
2-vinyl-1-(3-sulphopropyl)pyridinium betaine,
4-vinyl-1-(3-sulphopropyl)pyridinium betaine,
1-vinyl-3-(3-sulphopropyl)imidazolium betaine, or
sulphopropylmethyldiallylammonium betaine.

In one embodiment, monomer A$_b$ comprises a compound selected from the following compounds:

(SPE)

(SPP)

(SHPE)

(SHPP)

(SPDA)

In one embodiment, the monomer A$_b$ is selected from sulphopropyldimethylammonioethyl methacrylate (SPE), SPP, and mixtures thereof.

In one embodiment, polyvalent monomers are 1,4-butanediol diacrylate, 1,4-butanediol dimethacrylate, poly(ethylene and/or propylene oxide), if appropriate random or in the block form, diacrylate or dimethacrylate, ethylene glycol diacrylate or dimethacrylate, propylene glycol diacrylate or dimethacrylate, dipentaerythritol pentaacrylate, pentaerythritol tetraacrylate, pentaerythritol triacrylate, trimethylolpropane triacrylate, divinyl esters of polycarboxylic acid, diallyl esters of polycarboxylic acid, triallyl terephthalate, diallyl maleate, diallyl fumarate, diallyl succinate, trimethylolpropane triacrylate, N,N'-ethylenebismethacrylamide, N,N'-ethylenebisacrylamide, N-[2-(acryloylamino)-1,2-dihydroxyethyl]acrylamide, 3-{3-[3-(acryloyloxy)-2-hydroxypropoxy]-2-hydroxypropoxy}-2-hydroxypropyl acrylate.

The polyvalent, preferably divalent or trivalent, monomer is preferably N,N'-methylenebisacrylamide (MBA) or triacryloylhexahydrotriazine (TAHT).

The optional monomers B$_a$ used alone or in a polymerizable mixture are preferably ethylenically unsaturated carboxylic acid and carboxylic acid anhydride; ethylenically unsaturated carboxylic acid and carboxylic acid anhydride; orethylenically unsaturated amine and cationic monomers.

Ethylenically unsaturated carboxylic acid and carboxylic acid anhydride monomers include, but not limited to, acrylic acid, methacrylic acid, ethacrylic acid, α-chloroacrylic acid, α-cyanoacrylic acid, 1-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, 2-methyl-2-butene dicarboxylic acid, maleamic acid, N-phenyl maleamide, maleamide, maleic anhydride, fumaric anhydride, itaconic anhydride, citraconic anhydride, mesaconic anhydride, methyl itaconic anhydride, ethyl maleic anhydride, diethylmaleate, methylmaleate and maleic anhydride.

Ethylenically unsaturated hydroxide and non-ionic monomers include, but not limited to, hydroxyethyl acrylate, hydroxyethyl methacrylate, hydroxypropyl acrylate, hydroxypropyl methacrylate, glycidyl acrylate, glycidyl methacrylate, 2.3-dihydroxypropyl acrylate, 2.3-dihydroxypropyl methacrylate, acrylamide (AM), methacrylamide, N-methylolacrylamide, N-methylolmethacrylamide, N-(2-hydroxyethyl)acrylamide, N-(2-hydroxyethyl)methacrylamide, dimethylacrylamide, dimethylmethacrylamide, poly(ethylene and/or propylene oxide), if appropriate random or in the block form, α-acrylates or α-methacrylates, N-[2-hydroxy-1,1-bis(hydroxymethyl)ethyl]acrylamide, N-[2-hydroxy-1,1-bis(hydroxymethyl)ethyl]methacrylamide vinyl alcohol and vinyl pyrrolidone.

Anionic monomers include, but not limited to, the salts of ethylenically unsaturated carboxylic acid and sulfonic acid include sodium(meth)acrylate, sodium itaconate, 2-acrylamido-2-methylpropane sulfonate, sodium styrene sulfonate, sodium vinylsulfonate, sodium allylsulfonate and sodium sulfomethyl(meth)acrylamide.

Ethylenically unsaturated amine and cationic monomers include, but not limited to dimethylaminoethyl(meth)acrylate or (meth)acrylamide, trimethylaminoethyl(meth)acrylate or (meth)acrylamide salts, dimethylaminopropyl(meth)acrylate or (meth)acrylamide, trimethylaminopropyl(meth)acrylate or (meth)acrylamide salts, diethylaminoethyl(meth)acrylate or (meth)acrylamide and diallyldimethylammonium salts.

The polymers are thus prepared by an inverse polymerization process which comprises the following steps:
1) preparation of the inverse emulsion, and
2) polymerization.

Step 1) is carried out by emulsification of a mixture comprising the aqueous phase comprising the monomers, the external phase and at least one emulsifying agent. The polymerization is carried out by bringing together the monomers $A_b$ and optionally the monomers $B_a$ with a compound which generates free radicals and the polymerization is carried out at a temperature between, for example, ambient temperature and 75° C., depending on the initiating system chosen.

Use may be made of any inert hydrophobic liquid, for example aliphatic and aromatic hydrocarbons and halocarbons, such as toluene, xylene, o-dichlorobenzene, perchloroethylene, hexane, heptane, kerosene, a mineral oil and Isopar M, a substance of isoparaffin type of high purity sold by Exxon Corporation. Likewise, use may be made of any conventional water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. The preferred emulsifying agents are sorbitan monooleate.

These emulsifying agents constitute from 0.5% to 10% approximately, preferably from 1% to 5% approximately, by weight of the emulsion.

The ratio of the aqueous phase to the oil phase can vary within wide limits. Generally, the water-in-oil emulsions comprise from 20% to 80% approximately of aqueous phase and thus between 80% and 20% approximately of oil phase, these percentages being based on the total weight of the water-in-oil emulsion. A preferred ratio of the aqueous phase to the oil phase is 70 to 75% approximately of the aqueous phase for 30-25% approximately of the oil phase, percentages based on the total weight of the water-in-oil emulsion.

Step 2): polymerization: As was said above, the polymerization is triggered by means of a chemical initiator comprising free radicals. This initiator can be dissolved either in the oil phase or in the aqueous phase, according to its solubility characteristics. Mention may be made, as examples of water-soluble initiators, of 4,4'-azobis[4-cyanovaleric acid] (abbreviated to ACVA), potassium persulphate ($K_2S_2O_8$) and t-butyl hydroperoxide.

Mention may be made, as examples of oil-soluble initiators, of azobisisobutyronitrile (AIBN) or 2,2'-azobis(2,4-dimethylvaleronitrile) (ADVN). Use may also be made of water-soluble initiators of redox type, such as bromate/bisulphite or metabisulphite (for example, $KBrO_3/NaHSO_3$ or $KBrO_3/NaS_2O_5$) or persulphate/bisulphite initiators. The proportion of chemical initiator used depends on several factors. If, thus, it is necessary to maintain a desired reaction rate, the proportion of initiator has to be increased as the reaction temperature falls. By adjusting the reaction temperature and the proportion of initiator, it is possible to carry out the polymerization in a reasonable time and with a reasonable conversion of monomer to polymer, retaining the advantages of a polymerization at low temperatures.

Another aspect of the invention is the use of the elastomers capable of swelling in oil and/or in water and brine as made by the process as defined above and in the examples herein below, for the preparation of swellable/expandable packers, profilers, coatings and powders.

Other characteristics or advantages of the invention may become apparent in the light of the examples which follow, given by way of illustration without a limiting nature.

Example 1

A poly(acrylamide/SPP) 90/10 mol/mol cross-linked by 0.0025 mol % of N,N'-methylenebisacrylamide (MBA) Example 1 was polymerized in inverse emulsion. The polymer synthesis is composed by 2 steps: emulsion preparation and polymerization.

Emulsion Preparation:

At room temperature in a 2 liter glass flask are mixed 26.3 grams ("g") of Alkamuls S20, 75.1 g of Alkamuls S80, 16.5 g of Rhodibloc RS, 7.1 g of Hypermer B246SF and 797 g of Exxsol D100S. Under magnetic stirring the mixture is kept until limpid solution is obtained (mixture 1). In another 2 liter glass flask are mixed 250.9 g of SPP, 1097.2 g of 50% acrylamide, 0.033 g of MBA, 2.44 g of 2,2'-azobis(2-methylpropionamidine)dihydrochloride (Wako V-50) and 2 g of Versene 100. Under magnetic stirring the mixture is also kept until limpid solution is obtained (mixture 2). Afterwards, the mixture 2 is added in the mixture 1 under magnetic stirring. The emulsion obtained is then mixed by using a rotor stator (Ultra-turrax) at 1000 revolutions per minute (rpm) over 10 seconds (s).

Copolymerization:

The polymerization step is carried out by circulating the mixture obtained in step 1 in a continuous tubular reactor wherein the temperature is being kept at 60° C., with a 2 hour residence time.

Final product obtained contains 30 to 35 percent by weight ("wt %") of active polymer and the particle size is about 500 to 600 nm average (determined by light scattering using a Malvern Zeta-sizer device, in case of larger particles, microscopic observations are needed to determine the particle size). Particle size can be adjusted by controlling both the surfactant content and the shear applied during the preparation of the emulsion. Practically speaking, particle size is controllable in a range of 150 nm to 50 μm.

Example 2

Poly(acrylamide/SPP) 90/10 mol/mol cross-linked by 0.2 mol % of MBA was polymerized in inverse emulsion. The process of Example 1 is repeated except using 2.644 g (instead of 0.033 g) of MBA.

Example 3

Poly(acrylamide/SPP) 90/10 mol/mol crosslinked by 0.005 mol % of triacryloylhexahydrotriazine (TAHT) was polymerized in inverse emulsion. The process of Example 1 is repeated except using 0.105 g of TAHT instead of 0.033 g of MBA.

Example 4

Poly(acrylamide/SPP) 90/10 mol/mol cross-linked by 2 mol % of plow polyethylene glycol diethyl acrylate (Cognisa) was polymerized in inverse emulsion. The polymer synthesis is composed by 2 steps: emulsion preparation and polymerization.

Emulsion Preparation:

At room temperature in 3 liter glass flask are mixed 32.8 g of Alkamuls S20, 93.9 g of Alkamuls S80, 20.6 g of Rhodibloc RS, 8.9 g of Hypermer B246SF and 1007 g of Exxsol D100S. Under magnetic stirring the mixture is kept until limpid solution is obtained (mixture 1). In 2 liter glass flask are mixed 250.8 g of SPP, 1097.3 g of 50% acrylamide, 401.4 g of plow, 2.44 g of 2,2'-azobis(2-methylpropionamidine) dihydrochloride (Wako V-50) and 1 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 20 s.

Copolymerization:

The polymerization step is carried out by circulating the mixture obtained in step 1 in a continuous tubular reactor wherein the temperature is being kept at 60° C., with a 2 hour residence time.

Example 5

Poly(acrylamide/SPP) 90/10 mol/mol cross-linked by 0.0025 mol % of MBA and 0.005 mol % of PEG400DMA LI was polymerized in inverse emulsion. The process of Example 1 is repeated except adding 0.230 g of PEG400DMA LI (polyethylene glycol dimethyl acrylate) commercialized by the Cognis company during the preparation of mixture 2.

Comparative Example 6

Poly(acrylamide/SPP) 90/10 mol/mol was polymerized in inverse emulsion. The process of Example 1 is repeated except using no crosslinker, MBA.

Example 7

Poly(acrylamide/SPP) 90/10 mol/mol crosslinked by 0.05 mol % of MBA was polymerized in inverse emulsion. The process of Example 1 is repeated except using 0.66 g (instead of 0.033 g) of MBA.

Example 8

Poly(acrylamide/SPP/N-(hydroxymethyl)acrylamide) 89/10/1 mol/mol/mol crosslinked by 0.0025 mol % of MBA was polymerized in inverse emulsion. The polymer synthesis is composed by 2 steps: emulsion preparation and polymerization.

Emulsion Preparation:

At room temperature in a 2 liter glass flask are mixed 17.33 g of Alkamuls S20, 49.54 g of Alkamuls S80, 10.85 g of Rhodibloc RS, 4.71 g of Hypermer B246SF and 525.6 g of Exxsol D100S. Under magnetic stirring the mixture is kept until limpid solution is obtained (mixture 1). In another 2 liter glass flask are mixed 167.3 g of SPP, 723.9 g of acrylamide at 50%, 12.05 g of N-(hydroxymethyl)acrylamide at 48%, 0.022 g of MBA, 1.63 g of 2,2'-azobis(2-methylpropionamidine)dihydrochloride (Wako V-50) and 1.6 g of Versene 100. Under magnetic stirring the mixture is also kept until limpid solution is obtained (mixture 2). Afterwards the mixture 2 is added in the mixture 1 under magnetic stirring. The emulsion obtained is then mixed by using a rotor stator (Ultra-turrax) at 1000 rpm over 10 s.

Copolymerization:

The polymerization step of the above mixture is carried out in a continuous tubular reactor by keeping the temperature of the mixture at 60° C. with a 2 hour residence time.

Example 9

Poly(acrylamide/SPP/N-(hydroxymethyl)acrylamide) 80/10/10 mol/mol/mol crosslinked by 0.0025 mol % of MBA was polymerized in inverse emulsion was polymerized in inverse emulsion.

The process of Example 1 is repeated except using 165.3 g (instead of 167.3 g) of SPP, 643 g (instead of 723.9 g) of acrylamide at 50%, 119.1 g (instead of 12.05 g) of N-(hydroxymethyl)acrylamide at 48%, and 1.4 g (instead of 1.6 g) of Versene 100.

Swelling Tests

Swelling properties (above 100%) are tested by immersing samples of the elastomer in various fluids. Initial sample dimensions are approximately 3 cm×1 cm×0.35 cm. Swelling tests are run at 60° C. Samples are weighted before immersion (mi) and, when removed from solution, are quickly cleaned of excess fluid and weighted (m). The swelling is reported as a percentage using the following formula: % swelling=(m/mi−1)×100.

Aqueous swelling tests are run in either deionised water or salt solutions containing respectively 4 wt % NaCl, 4 wt % CaCl2 or 20 wt % NaCl.

Swelling in oil is run using either a non-aromatic oil EDC 95-11 from Total Fluides or a heavy hydrotreated naphtenic distillates IRM-903 from Calumet Lubricants Co.

Example 10

Silicone Rubber

Inverse emulsion polymer from Example 1 is directly blended with commercially available Rhodorsil CAF4 resin (from Blue Star silicones). Resin and inverse emulsion are gently mixed for 5 minutes to obtain a fluid homogeneous mixture. Respective quantities of silicone resin and inverse emulsion from Example 1 are reported in Table 1 below.

TABLE 1

| sample # | polymer content in dry elastomer (wt %) | m silicone resin (g) | m inverse emulsion (g) |
|---|---|---|---|
| 6-1 | 0 | 100 | 0 |
| 6-2 | 15 | 67 | 33 |
| 6-3 | 18 | 60 | 40 |
| 6-4 | 25 | 50 | 50 |

The mixture is then moulded in 3.5 mm thick sheets and let set at room temperature for 4 days. Then unmolded samples are aged for 3 days at 60° C. in an oven prior performing swelling tests in salted water and in oil and whose results are gathered in Tables 2 and 3 below.

TABLE 2

Swelling in 20% NaCl solutions

| polymer content in dry elastomer (wt %) | 7 days (wt %) | 14 days (wt %) |
|---|---|---|
| 0 | 0 | 0 |
| 15 | 80 | 93 |
| 18 | 138 | 155 |
| 25 | 230 | 258 |

Table 2 shows that the swelling increases with the polymer content.

TABLE 3

Swelling in oil (EDC 95-11)

| polymer content in dry elastomer (wt %) | 7 days (wt %) | 14 days (wt %) |
|---|---|---|
| 0 | 86 | 60 |
| 15 | 81 | 82 |
| 18 | 80 | 85 |
| 25 | 61 | 81 |

Table 3 shows that the swelling is substantially independent of polymer content. within the range tested.

Example 11

Polyurethane Rubber

The Polyurethane rubber used is based on an isocyanate functionalized polybutadiene (Krasol NN-3A) and a polybutadiene chain extender (poly BD R45HT), both from Sartomer. Resins and inverse emulsion are gently mixed for 5 minutes to get a fluid homogeneous mixture. Respective quantities of resins and inverse emulsion are reported in Table 4 below.

TABLE 4

|  | m (g) | % |
|---|---|---|
| Krasol NN-3A | 10 | 23.15 |
| poly BD R45 | 7.5 | 17.36 |
| inverse emulsion | 25.7 | 19.63 |

These elastomers are cured at ambient temperature 2 days then aged 7 days at 60° C. then compounded with the polymerized emulsion from Example 1 before performing swelling tests.

The results obtained are gathered in the following Table 5 wherein the swelling values are mentioned in % by weight:

TABLE 5

| Fluid | Swelling Time | | |
|---|---|---|---|
|  | 1 day | 7 days | 14 days |
| naphtenic oil (IRM 903) | 54 | 110 | 118 |
| deionised water | 80 | 236 | 264 |
| 4% CaCl2 | 137 | 236 | 294 |
| 4% NaCl | 140 | 242 | 290 |
| 20% NaCl | 147 | 260 | 294 |

Degree of Crosslinking

Swelling tests with composite polyurethane rubber elastomers are performed in 20% NaCl solutions. If the hydrophilic polymer crosslinking degree is too low or not crosslinked, leak offs can be evidenced by following the long term swelling as illustrated in Table 6 below.

TABLE 6

|  | Swelling Time | | | |
|---|---|---|---|---|
|  | 7 days | 14 days | 28 days | 56 days |
| Example #6 (no MBA) | 240 | 230 | 170 | 86 |
| Example #1 (0.0025% MBA) | 270 | 310 | 350 | 190 |
| Example #7 (0.05% MBA) | 260 | 300 | 330 | 320 |

Example 12

Polyurethane Rubber with OH Functional Polymer

The Polyurethane rubber preparation and testing procedure are identical as in Example 11. Compounding with the emulsion polymerization of Example Numbers 1; 8, and 9. Swelling tests with composite polyurethane rubber elastomers are performed in 20% NaCl solutions and the results are gathered in Table 7 below.

TABLE 7

|  | Swelling Time | | | | |
|---|---|---|---|---|---|
|  | 7 days | 14 days | 28 days | 56 days | 84 days |
| Example #1 (0.0025% MBA) | 270 | 310 | 350 | 190 | 162 |
| Example #8 (1% AmOH) | 180 | 230 | 284 | 331 | 330 |
| Example #9 (10% AmOH) | 190 | 220 | 247 | 276 | 293 |

Table 7 shows that the incorporation of OH functions on the hydrophilic polymer strongly enhances the stability of the swollen elastomer.

The invention claimed is:

1. A process for making an elastomer composition, comprising the steps of:
   a) making an aqueous inverse emulsion of particles of a polymer by inverse emulsion polymerization of monomers $A_b$ comprising a betaine group, hydrophilic monomers $B_a$, and polyvalent monomers $C_a$, wherein the emulsion is in the form of droplets of an aqueous phase dispersed in a hydrophobic external phase, the hydrophobic external phase comprises hydrophobic surfactants, and the molar ratio of the monomers $A_b$ to monomers $B_a$ is between 4/96 and 40/60, and
   b) compounding an elastomer with the aqueous inverse emulsion obtained by step a) to form the elastomer composition, wherein the aqueous inverse emulsion may, optionally, be partially or totally dewatered and de-oiled prior to said compounding,
wherein the elastomer composition is capable of swelling in oil and/or in water and brine.

2. A process according to claim 1, wherein in step a), a reactive monomer to chemical functions present in the elastomer is added to the aqueous inverse emulsion before its addition to said elastomer.

3. A process according claim 1, wherein the particles of polymer have a particle size of between 10 nm to 10,000 nm.

4. A process according to claim 1, wherein the aqueous inverse emulsion a) is partially or totally the step of dehydrating and de-oiling the aqueous inverse emulsion to form of a dry solid comprising the particles of the polymer and the hydrophobic surfactants, and wherein the elastomer is compounded with the particles of the polymer by mixing the elastomer with the dry solid.

5. A process according to claim 4, wherein the step of dehydrating and de-oiling the aqueous inverse emulsion is conducted by spray drying the aqueous inverse emulsion or by blowing hot air on the emulsion coated on a flat surface.

6. A process according to claim 1, wherein the aqueous inverse emulsion comprises between 10 and 40% by weight of water and the elastomer is compounded with the particles of the polymer by compounding from 51 to 99% by weight of the elastomer with from 1 to 49% by weight of the aqueous inverse emulsion.

7. A process according to claim 1, wherein the aqueous inverse emulsion of particles of a polymer is made by inverse emulsion polymerization of monomers $A_b$, hydrophilic monomers $B_a$, and polyvalent monomers $C_a$, and the quantity of polyvalent monomers $C_a$ is between 0.001 and 0.1 mol % of monomers $A_b$, $B_a$, and $C_a$.

8. A process according to claim 1, wherein the polyvalent monomer is N,N'-methylenebisacrylamide (MBA) or triacryloylhexahydrotriazine (TAHT).

9. A process according to claim 1, further comprising, prior to compounding the elastomer with the particles of the polymer, the step of dehydrating and de-oiling the aqueous inverse emulsion by mixing the inverse emulsion with a compound in which the polymer is not soluble and dissolving at least partially the other components of the inverse emulsion in the solvent to form a dry solid comprising the particles of the polymer, and wherein the elastomer is compounded with the particles of the polymer by mixing the elastomer with the dry solid.

10. A process according to claim 1, wherein the monomer $A_b$ comprising the betaine group is chosen from:

alkylsulphonates or -phosphonates of dialkylammonioalkyl acrylates or methacrylates, -acrylamides or -methacrylamides, heterocyclic betaine monomers, alkylsulphonates or -phosphonates of dialkylammonioalkylallylics, alkylsulphonates or -phosphonates of dialkylammonioalkylstyrenes, betaines resulting from ethylenically unsaturated anhydrides and dienes, and phosphobetaines.

11. A process according to claim 1, wherein the monomer $A_b$ comprises a compound selected from the following compounds:

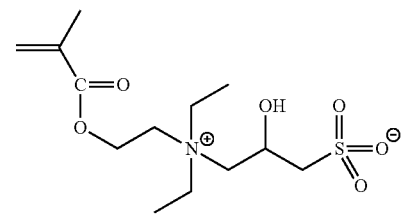

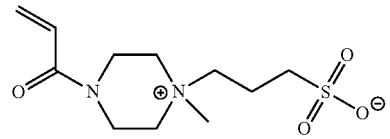

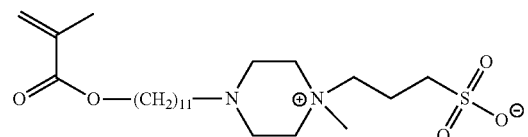

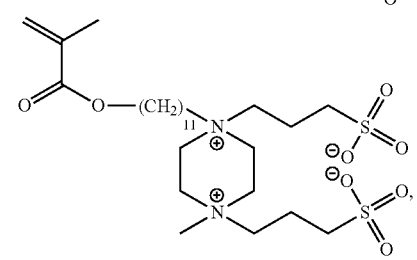

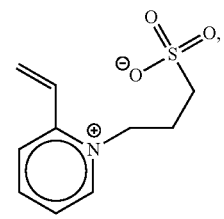

(SPV)

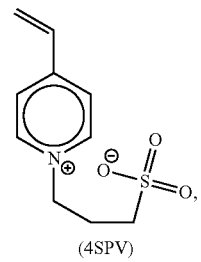

(4SPV)

12. A process according to claim 1, wherein the monomer $A_b$ comprises a compound according to the formula:

or the formula:

in which:
R¹ is hydrogen or methyl,
R² and R³, which are identical or different, are hydrogen or alkyls having from 1 to 6 carbon atoms,
Y₁ is a divalent group of formula —O— or NR₂,
Z⁻ is $SO_3^-$,
m is 2 or 3, and
n is 1-6.

13. A process according to claim 1, wherein the monomer $A_b$ is selected from:
sulphopropyldimethylammonioethyl methacrylate (SPE),
sulphoethyldimethylammonioethyl methacrylate,
sulphobutyldimethylammonioethyl methacrylate,
sulphohydroxypropyldimethylammonioethyl methacrylate (SHPE),
sulphopropyldimethylammoniopropylacrylamide,
sulphopropyldimethylammoniopropylmethacrylamide (SPP),
sulphohydroxypropyldimethylammoniopropylmethacrylamide (SHPP),
sulphopropyldiethylammonioethyl methacrylate,
2-vinyl-1-(3-sulphopropyl)pyridinium betaine,
4-vinyl-1-(3-sulphopropyl)pyridinium betaine,
sulphopropyldimethylammonioethyl methacrylate,
1-vinyl-3-(3-sulphopropyl)imidazolium betaine, and
sulphopropylmethyldiallylammonium betaine.

14. A process according to claim 1, wherein the monomer $A_b$ comprises one of the following compounds:

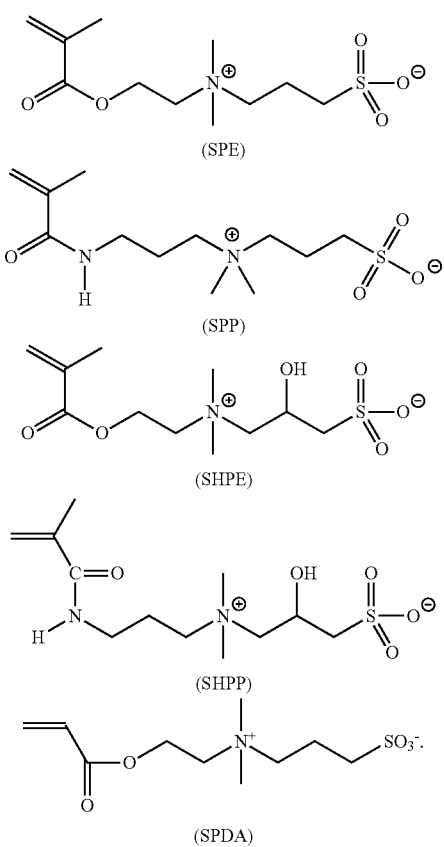

15. A process according to claim 1, wherein the monomers $B_a$ used alone or in a polymerizable mixture are:
   ethylenically unsaturated carboxylic acid and carboxylic acid anhydride;
   ethylenically unsaturated carboxylic acid and carboxylic acid anhydride; or
   ethylenically unsaturated amine and cationic monomers.

16. A process according to claim 15, wherein the monomer $B_a$ comprises acrylic acid, methacrylic acid, ethacrylic acid, α-chloroacrylic acid, α-cyanoacrylic acid, 1-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, 2-methyl-2-butene dicarboxylic acid, maleamic acid, N-phenyl maleamide, maleamide, maleic anhydride, fumaric anhydride, itaconic anhydride, citraconic anhydride, mesaconic anhydride, methyl itaconic anhydride, ethyl maleic anhydride, diethylmaleate, methylmaleate, maleic anhydride; hydroxyethyl acrylate, hydroxyethyl methacrylate, hydroxypropyl acrylate, hydroxypropyl methacrylate, glycidyl acrylate, glycidyl methacrylate, 2.3-dihydroxypropyl acrylate, 2.3-dihydroxypropyl methacrylate, acrylamide (AM), methacrylamide, N-methylolacrylamide, N-methylolmethacrylamide, N-(2-hydroxyethyl)acrylamide, N-(2-hydroxyethyl)methacrylamide, dimethylacrylamide, dimethylmethacrylamide, poly(ethylene and/or propylene oxide), α-acrylates or α-methacrylates, N-[2-hydroxy-1,1-bis(hydroxymethyl)ethyl]acrylamide, N-[2-hydroxy-1,1-bis(hydroxymethyl)ethyl]methacrylamide vinyl alcohol, vinylpyrrolidone, sodium(meth)acrylate, sodium itaconate, 2-acrylamido-2-methylpropane sulfonate, sodium styrene sulfonate, sodium vinylsulfonate, sodium allylsulfonate, sodium sulfomethyl(meth)acrylamide, dimethylaminoethyl (meth)acrylate or (meth)acrylamide, trimethylaminoethyl (meth)acrylate or (meth)acrylamide salts, dimethylaminopropyl(meth)acrylate or (meth)acrylamide, trimethylaminopropyl(meth)acrylate or (meth)acrylamide salts, diethylaminoethyl(meth)acrylate or (meth)acrylamide, or diallyldimethylammonium salts.

17. A process according to claim 16, wherein the monomer $B_a$ is acrylamide (AM).

18. A process according to claim 1, wherein the monomer $A_b$ is sulphopropyldimethylammonioethyl methacrylate (SPE) or sulphopropyldimethylammoniopropylmethacrylamide (SPP).

19. A process according to claim 1, wherein the hydrophilic non-ionic monomer $B_a$ is: acrylamide (AM), and the monomer $A_b$ is selected from sulphopropyldimethylammonioethyl methacrylate (SPE) and SPP.

20. A process according to claim 1, wherein the elastomer is chosen from a mono-component room temperature vulcanisable silicone, a polyurethane rubber based on the curing of an isocyanate functionalized polybutadiene system with a polybutadiene chain extender, an EPDM rubber or a nitrile rubber.

* * * * *